UNITED STATES PATENT OFFICE.

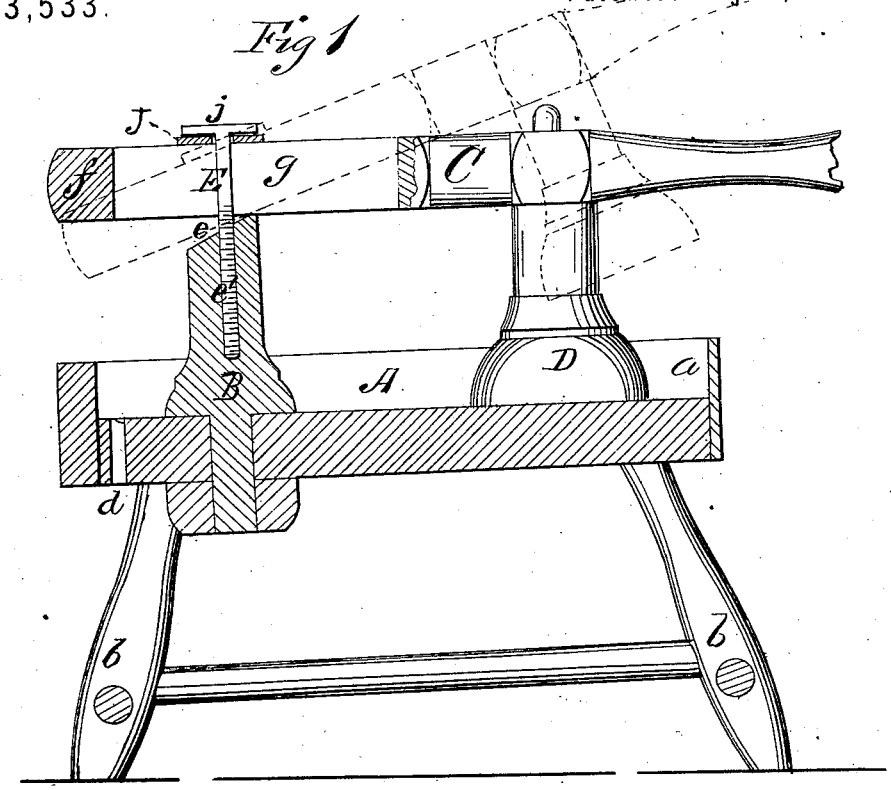
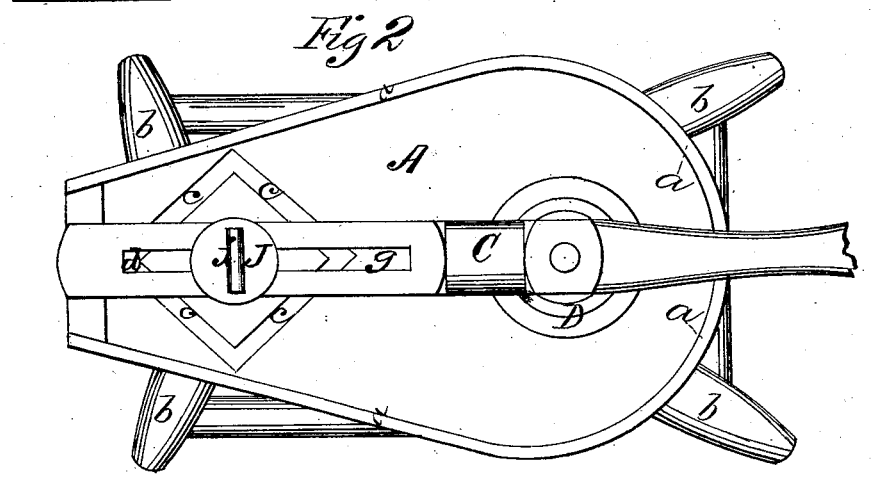

WILSON RYDER, OF CATTARAUGUS, NEW YORK.

IMPROVEMENT IN BUTTER-WORKERS.

Specification forming part of Letters Patent No. 163,533, dated May 18, 1875; application filed December 26, 1874.

*To all whom it may concern:*

Be it known that I, WILSON RYDER, of Cattaraugus, in the county of Cattaraugus and State of New York, have invented a new and valuable Improvement in Butter-Workers; and I do hereby declare that the following is a full, clear, and exact description of the construction and operation of the same, reference being had to the annexed drawings making a part of this specification, and to the letters and figures of reference marked thereon.

Figure 1 of the drawing is a representation of a side view, part sectional, of my butter-worker; and Fig. 2 is a top plan view of the same.

The nature of the invention consists in the employment of an inclined table having a surrounding flange to prevent the escape of butter, and an aperture for the escape of the buttermilk, in combination with a bar having in one end a long vertical slot, to which bar is rigidly secured, at or near the center of its length, a kneading or pressure block, through which slot a cross-headed pin is passed, and then screwed into the upper rearwardly-beveled end of a standard erected in a butter-trough, whereby a horizontally and vertically, as well as an endwise, motion may be imparted to the said block, thereby effecting a speedy separation of the milk and butter, all as will be hereinafter more fully explained.

In the annexed drawings, A designates a butter-trough having a rounded flange, $a$, which is supported in an inclined position upon legs $b$, as shown in Fig. 1. The object of the flange $a$ is to prevent the escape or overflow of butter and buttermilk from the table in the process of working the butter. The contracted rear end of this trough has a rectangular groove, $c$, in its bottom, by means of which buttermilk is conveyed from it into an aperture, $d$, cut through its bottom into a vessel below. B designates a standard or post erected near the small end of the trough, upon which the kneading device, hereinafter described, is designed to be mounted. The rear upper edge of this post is beveled at $e$, as shown in Fig. 1. C designates an actuating-bar, to which is secured, at or near the middle of its length, a kneading-block, D. This bar has a rectangular extremity, $f$, through which is cut a vertical slot, $g$, through which is passed a cross-headed pin or bolt, E, having a screw-threaded end, $e'$, which is screwed into post B, as shown in Fig. 1.

By this means the actuating-bar is allowed to have a free endwise, a laterally-vibratory, and, owing to the rear upper edge of the said post being cut away, a vertically-vibratory motion, whereby the kneading-block, at the same time that it expresses the buttermilk from the butter, will impart to it a rolling motion back and forth, thereby avoiding the breaking up of the grain. As the buttermilk is expressed from the butter it runs down the inclined bottom of the trough A into groove $c$, escaping thence through perforations $d$ into a vessel placed under it for its reception.

With a view to preventing the casual detachment of bar C, should the head $j$ of pin E be turned in the length of slot $g$, I have interposed a washer, J, between the head of the pin and the said bar, effectually preventing such a detachment.

I am aware that a machine for kneading dough has heretofore been employed, in which a vertical longitudinal and rotary movement may be imparted to the kneading-block, as shown in Letters Patent granted to C. C. Johnson, dated July 2, 1867, and I therefore lay no claim to such invention.

What I claim as new, and desire to secure by Letters Patent, is—

The inclined table A, having the surrounding flange $a$, rectangular groove $c$, and aperture $d$, in combination with the slotted bar C, provided with the block D, standard B, and pivotal pin E, substantially as and for the purpose set forth.

In testimony that I claim the above I have hereunto subscribed my name in the presence of two witnesses.

WILSON RYDER.

Witnesses:
CLARK SHELDON,
W. J. HARKNESS.